(12) United States Patent
Nicolet

(10) Patent No.: US 8,195,840 B2
(45) Date of Patent: Jun. 5, 2012

(54) METHOD FOR CONTROLLING THE ACTIVE DATA INTERFACE WHEN MULTIPLE INTERFACES ARE AVAILABLE

(75) Inventor: Richard Nicolet, Menlo Park, CA (US)

(73) Assignee: Logitech Europe S.A., Morges (CH)

( * ) Notice: Subject to any disclaimer, the term of this patent is extended or adjusted under 35 U.S.C. 154(b) by 43 days.

(21) Appl. No.: 11/750,199

(22) Filed: May 17, 2007

(65) Prior Publication Data

US 2008/0288707 A1    Nov. 20, 2008

(51) Int. Cl.
*G06F 3/00* (2006.01)
*G06F 13/00* (2006.01)
(52) U.S. Cl. .............. 710/14; 710/8; 710/104
(58) Field of Classification Search .......... 710/14, 710/8, 104
See application file for complete search history.

(56) References Cited

U.S. PATENT DOCUMENTS

| | | | |
|---|---|---|---|
| 2007/0162634 A1* | 7/2007 | Okazaki | 710/15 |
| 2007/0175994 A1* | 8/2007 | Fruhauf | 235/440 |
| 2008/0105743 A1* | 5/2008 | Mills | 235/441 |
| 2008/0183909 A1* | 7/2008 | Lim et al. | 710/14 |

* cited by examiner

*Primary Examiner* — Chun-Kuan Lee
*Assistant Examiner* — Farley Abad
(74) *Attorney, Agent, or Firm* — Kilpatrick Townsend & Stockton LLP

(57) ABSTRACT

Systems and methods are provided for controlling which of multiple data interfaces in an electronic device is used for communication with another electronic device so as to minimize disruption of the user experience. In one embodiment, a switch may be provided that is configured to maintain the data stream through a presently used data interface even when other data interfaces become physically connected or available for data transfer. Benefits of unused, but nevertheless connected data interfaces may be received by the electronic device without initiating a transfer of the communication duties between interfaces.

21 Claims, 3 Drawing Sheets

METHOD FOR CONTROLLING THE ACTIVE DATA INTERFACE WHEN MULTIPLE INTERFACES ARE AVAILABLE

BACKGROUND OF THE INVENTION

The present invention relates to communication between a peripheral device and a host device via multiple bus interfaces, and particularly, to a wireless webcam which can be powered through a USB bus.

The use of numerous peripheral devices has become pervasive. Each host (e.g., a user's personal computer) often has several peripheral devices connected to it, such as keyboards, mice, trackballs, webcams, other digital cameras, joysticks, gamepads, personal digital assistants (PDAs), portable media players, and so on. Each of these peripheral devices often have several data interfaces for communicating with the host, such as a parallel port, a USB port, a wireless transceiver, etc.

The USB standard allows peripheral devices to both have data communication and receive power over the same cable. This has spawned many types of devices. For example, devices that provide data by other means, such as wireless, might connect to a USB port simply to receive power. A docketing station and special power port may provide that only the power connectors are used. Wireless USB devices can transmit to a dongle receiver plugged into a USB port on a computer. Other devices may provide both wireless and wired connections, with the user being able to select which one is more appropriate at any given time.

While any of such multiple data interfaces can be used to connect the device to the host, it is not conventionally possible to change the interface used to carry the data stream between the peripheral and the host without needing to interrupt the data stream in some way and therefore disrupt the user experience. For example, the user may be required to exit or close the application using the device and to re-enter or re-start the application using the new interface. Even where the user is not required to exit and re-enter the application, methods of automatically switching the data stream between data interfaces may cause unnecessary opportunities for disruption of the user experience.

In one exemplary scenario where the user is involved in a video instant messaging (VIM) conversation using a wireless webcam and an instant messaging application, the battery of the wireless webcam may be running low and the user may be required to dock the wireless webcam in a docking station to provide continued operating power to the webcam. The docking station may be configured to communicate with the user's PC (i.e., the host device) via a USB interface. Generally, when a USB enabled peripheral device is connected to a plug-and-play USB bus of the host device, the host device detects the peripheral device and automatically begins the process of communicating with the peripheral device via the connected pins to initiate the data stream between the two devices.

Accordingly, there is a need for a system and method for managing the data stream so as to limit unnecessary transfers between data interfaces and attendant disruptions.

BRIEF SUMMARY OF THE INVENTION

The present invention provides systems and methods for controlling which of multiple data interfaces provided with an electronic device is used for communication with another electronic device so as to minimize disruption of the user experience. Moreover, benefits of unused, but nevertheless connected data interfaces may be received by the electronic device without initiating an unnecessary transfer of the communication duties between interfaces.

One aspect of the invention is directed to an electronic device that includes an element for generating or receiving a data stream and a plurality of data interfaces each capable of individually carrying the data stream to or from a second device. A switch is provided for controlling which of the plurality of data interfaces is presently used to carry the data stream. The switch is configured to maintain the data stream through a presently used data interface when other, plug-and-play data interfaces become physically connected to the second plug-and-play device or become available to carry the data stream to the second device.

In one embodiment, the presently used interface is wireless and the other interface is wired. The switch is configured to deactivate data lines associated with the wired data interface so long as the wireless data interface is available to carry the data stream to the second device.

In one embodiment, the invention provides a wireless webcam which also has a wired USB connection. When the webcam batteries are low, the a USB cable can be connected to the wired USB connection to provide power to recharge the batteries. An internal switch automatically disconnects the USB wired data lines if the wireless connection is active, to avoid an attempt by the computer/host to connect over the wired USB, and disrupt the wireless stream. If the wireless stream is lost, such as by a wireless dongle receiver being removed, the switch can automatically connect the wired data lines to continue the data flow.

Another aspect of the invention is directed to a method of controlling an electronic device in communication with a second device. The method includes generating a data stream, controlling which of a plurality of data interfaces is presently used to carry the data stream to the second device, and maintaining the data stream through a presently used data interface when other, plug-and-play data interfaces become physically connected to the second device or become available to carry the data stream to the second device.

Further aspects and advantages of the invention are described in the following detailed description of the embodiments of the invention.

DETAILED DESCRIPTION OF THE INVENTION

Embodiments of the present invention provide an electronic device, such as a webcam, that includes multiple data interfaces or paths for communicating with a second electronic device, such as a personal computer. For example, the electronic device may transmit a data stream generated by the electronic device to the second device and receive control and/or other data signals back from the second electronic device. Systems and methods are provided to control which of the available data interfaces is used for communication between the devices, and to minimize disruption of the user experience that may be caused by unnecessary switching between one data interface to another. In some embodiments, one data interface is a wireless communication data interface and another data interface is a wired communication data interface, which may be a plug-and-play data interface. It is contemplated, however, that a plurality of data interfaces may be provided that enable communication using any combination of wired or wireless data transfer protocols. In some embodiments, benefits of connecting a wired data interface to another electronic device are utilized without initiating an unnecessary transfer of the data stream to the wired data interface. For example, battery power for the electronic device may be derived from a USB plug connected to the second electronic device without switching the data stream to that wired data interface.

Figure 1:
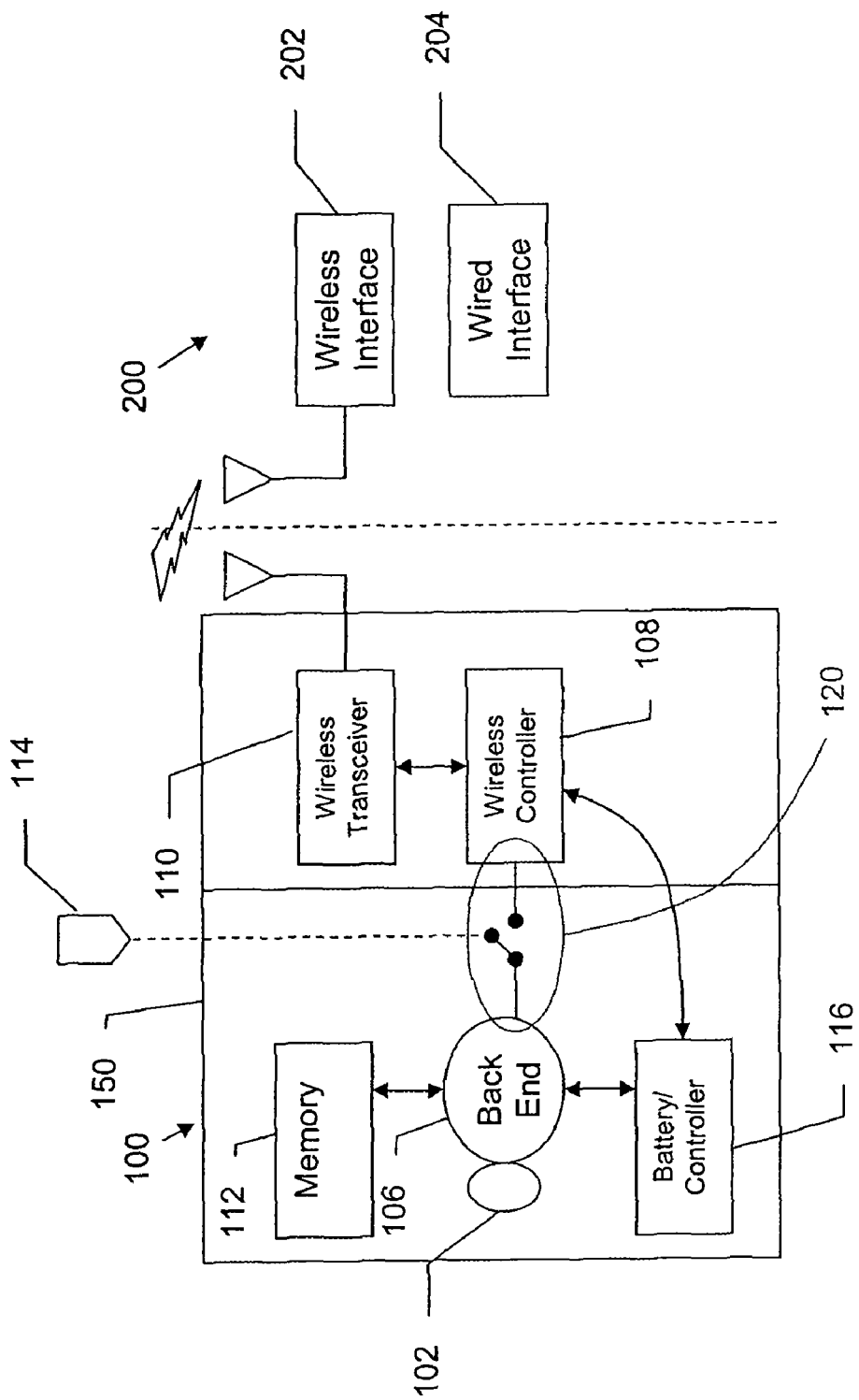
FIG. 1 is a block diagram of an embodiment of a system incorporating the present invention.

FIG. 1 is a block diagram of an embodiment of a system incorporating the present invention. A webcam device 100 may include a camera image sensor 102 and a back end controller 106. Audio and video signals from the sensor 102 may be received by controller 106, which generates a combined data stream. Controller 106 may include or may be connected to a USB controller. Controller 106 may also include or may be connected to a wireless controller 108, such as the Cypress EZ-Host or the Marvell 88W8388 wireless chip, which may then be connected to a wireless transceiver 110. Controller 106 may also include or may be connected to one or more memories 112, such as an EEPROM, for storing information and control software. A battery 116 may be provided to power the webcam device and may include a programmable microcontroller that handles power management in the webcam device. Some or all of these elements may be integrated into a single housing 150. Back end controller 106 may be connected to a USB plug 114, which may be disposed outside of housing 150.

A computer or other computing device 200 may communicate with webcam 100 through either a wired USB interface or a wireless transmission interface. For example, the data stream including the audio and video signals generated by the webcam may be transmitted from the webcam 100 to the personal computing device 200. Similarly, control signals and other data may be transmitted from the computing device to the webcam. Personal computing device 200 may include a wireless transceiver 202 that communicates with wireless transceiver 110 of the webecam device. Wireless transceiver 202 may be connected to a wireless controller (not shown), which may connect to a USB controller (not shown). Therefore, wireless transceiver 220 may be integrated into a USB dongle plugged into a USB port of the computing device. Personal computing device 200 may further include a wired interface 204, such as a USB port for receiving USB plug 114 of the webcam. Wired interface 204 may be a plug-and-play interface that enables the computing device 200 to automatically detect any devices connected to the interface 204.

In operation, controller 106, wireless controller 108, and wireless transceiver 110 of the webcam 100 may be used to create a wireless data interface with the personal computing device 200. The wireless data interface may be used to carry the data stream generated by the sensor 102. Similarly, controller 106, which may include a USB controller, and USB plug 114 may be used to create an independent, wired data interface with the computing device 200 that is also capable of carrying the data stream generated by the webcam to the computing device. Either data interface may also be independently capable of handling return communications from the computing device 200 to the webcam 100. Although two interfaces are described here, it is contemplated that a larger number of data interfaces may be enabled, which may utilize alternative data transfer protocols. For example, parallel port interfaces, HDMI interfaces, other interfaces utilizing common protocols for transferring electronic data, may all be used with the present invention. As shown in FIG. 1, a switch 120 may be located between controller 106 and the wireless controller 108 on the wireless interface path, and controller 106 and plug 114 on the wired interface path. Switch 120 is used to control which of the two interfaces actively carries the data stream generated from controller 106. The location of switch 120 in FIG. 1 is merely exemplary, and the switch may be alternatively disposed within controller 106, plug 114, or any other suitable location within the device 100 or external to it.

In one exemplary operating scenario, the webcam 100 may be actively and presently using the wireless data interface to communicate with computing device 200. That is, wireless transceiver 110 may be actively communicating with wireless transceiver 202 of the computing device, for example, to deliver video and audio data to the computing device during an Internet video chat session. The wired data interface may not be active (i.e., not presently being used to carry the data stream) and USB plug 114 may not be connected to USB port 204 of the computing device. Then, the user may choose to complete the connection for the wireless interface by plugging USB plug 114 into USB port 204 of the computing device. Conventionally, when this USB connection becomes complete, the computing device 200 and the webcam 100 immediately begin the process of negotiating a transfer of the data stream to the wired USB interface. For example, firmware located on the computing device or the webcam may automatically negotiate this transfer of the data stream when the newly completed connection is detected. Although methods of minimizing the disruption caused by the transfer of the data stream have been devised (see, commonly-assigned U.S. patent application Ser. No. 11/639,718, filed Dec. 15, 2006, entitled "Transparent Support of Multiple Bus Interfaces on a Device," which is incorporated by reference herein in its entirety), such transfer of the data stream may cause a heightened risk of disruption to the user experience.

Figure 2:
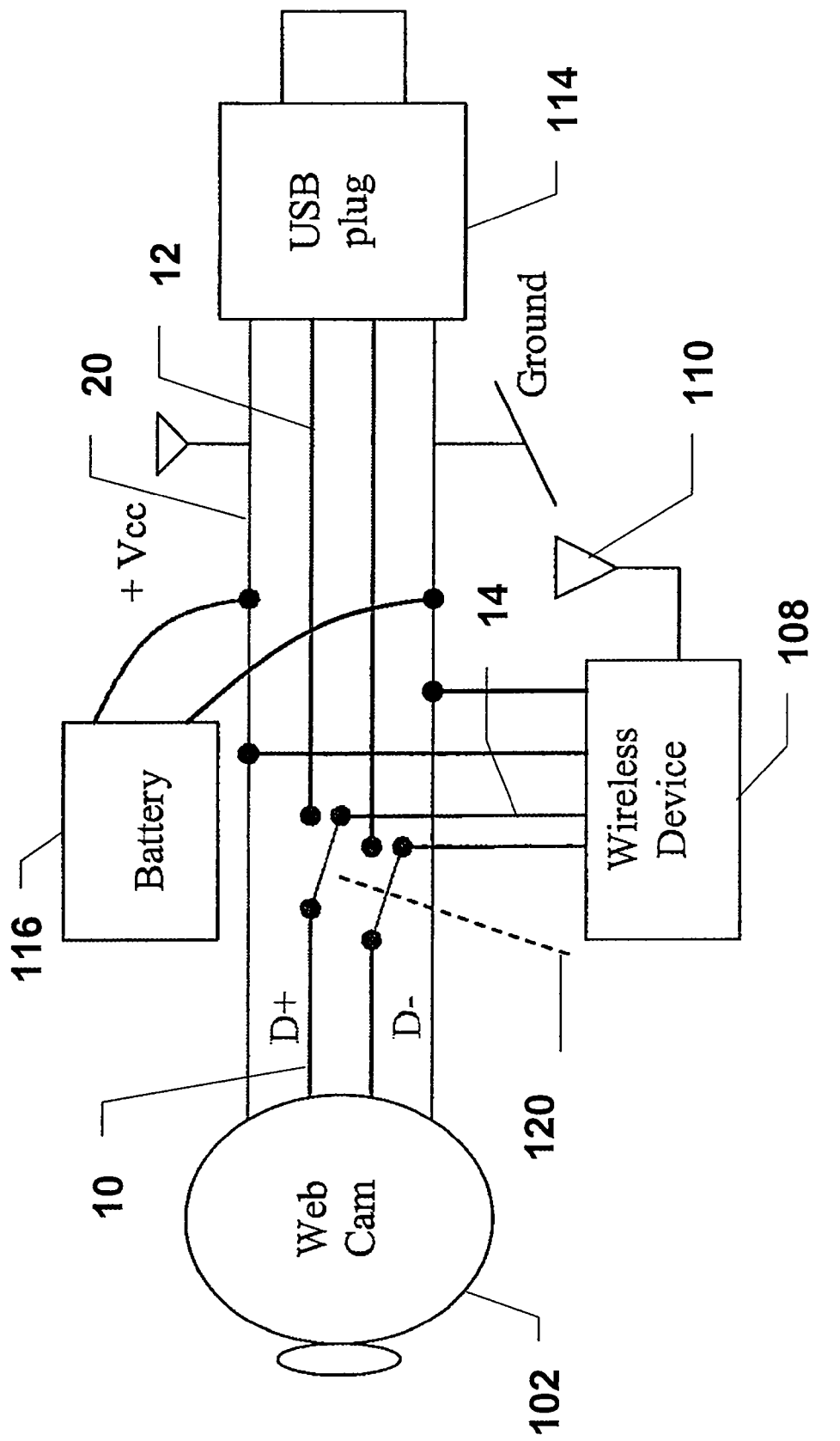
FIG. 2 is a diagram illustrating the detailed operation of the switch in accordance with an embodiment of the invention.

Referring to FIG. 2, in one embodiment of the present invention, a switch 120 may be provided to control which of the data interfaces (e.g., wireless interface and wired USB interface) is actively used to communicate with the computing device 200. With respect to the operating scenario described above, the switch 120 may be used to override any automatic transfer of the data stream from the wireless interface to the newly-connected, wired USB interface, and maintain the data stream through the active, wireless data interface. In one approach, the switch 120 may deactivate the data pins of the USB plug 114, for example, by electrically isolating the pins, effectively "hiding" the data pins. Therefore, when USB plug 114 is coupled with the computing device 200, the data pins of plug 114 are incapable of electrically completing the connection. Neither device 100/200 may be able to detect that the USB connector 114 has been coupled with port 204 and, as such, neither device may be caused to initiate an automatic process for transferring the data stream.

FIG. 2 illustrates further details of the above approach. Like elements from FIG. 1 are labeled alike in FIG. 2 (some elements have been omitted for clarity). In particular, switch 120 may be disposed between a signal source, such as camera 102, and multiple data interfaces, such as wireless device 108 and USB plug 114. Switch 120 may control which interface receives the data stream generated from the data source by, for example, alternatively connecting data lines 10 (labeled D+ and D−) with data lines 12, which feed the data pins of the USB plug 114, or data lines 14 of the wireless device 108. The switch may be a transistor switch, solenoid operated switch, or any other type of switch. Switch 120 may also be capable of entirely isolating a data interface, for example, if switch 120 residing within controller 106 isolated both the power and data lines leading to plug 114. Switch 120 may be controlled by firmware or other appropriate logic residing within the webcam 100 (e.g., within controller 106) or within computing device 200. Alternatively, switch 120 may be embodied as a physical switch that may be activated by the user.

In one preferred embodiment illustrated by FIG. 2, switch 120 only affects the data lines within webcam 100, and the power lines remain unaffected regardless of the position of switch 120. Therefore, when USB plug 114 is coupled to the computing device 200, and switch 120 is positioned so as to isolate the data pins of the USB plug, power may still be received from computing device through the power pins of the USB plug. In particular, power lines 20 may supply power from the computing device 200 to camera 102, wireless unit 108, any other elements of the webcam 100, as well as to battery 116 for recharging purposes. This embodiment is particularly useful in providing the user with an ability to dock a wireless-enabled webcam, which may be low on battery, with its powered USB connection without any disruption of the user experience that may result from a transfer of the data stream.

In another exemplary operating scenario, the webcam 100 may be actively communicating with computing device 200 using the wireless data interface, plug 114 is coupled with port 204, but switch 120 is positioned to isolate the data pins of plug 114 and prevent a completed connection with the computing device. In this scenario, should the wireless interface fail (e.g., transceiver 110 malfunctions or drops the link with transceiver 202), controller 106 is configured to react by controlling switch 120 to complete the data connection between data lines 10 and 12 to enable the wired USB interface to communicate with the computing device 200 (e.g., carry the data stream generated by the camera and microphone). Once the wired USB interface becomes the active, presently used interface, the switch 120 may operate to similarly maintain the data stream through this wired interface even when other data interfaces become available or become connected (e.g., if the wireless connection becomes available again). This approach prevents disruptions in the user experience caused by switching from one interface to another, for example, where a wireless connection is only intermittently available. Therefore, in this scenario, switch 120 may only return to using the wireless connection if the USB plug is disconnected from the computing device and the wired interface becomes unavailable.

Figure 3:
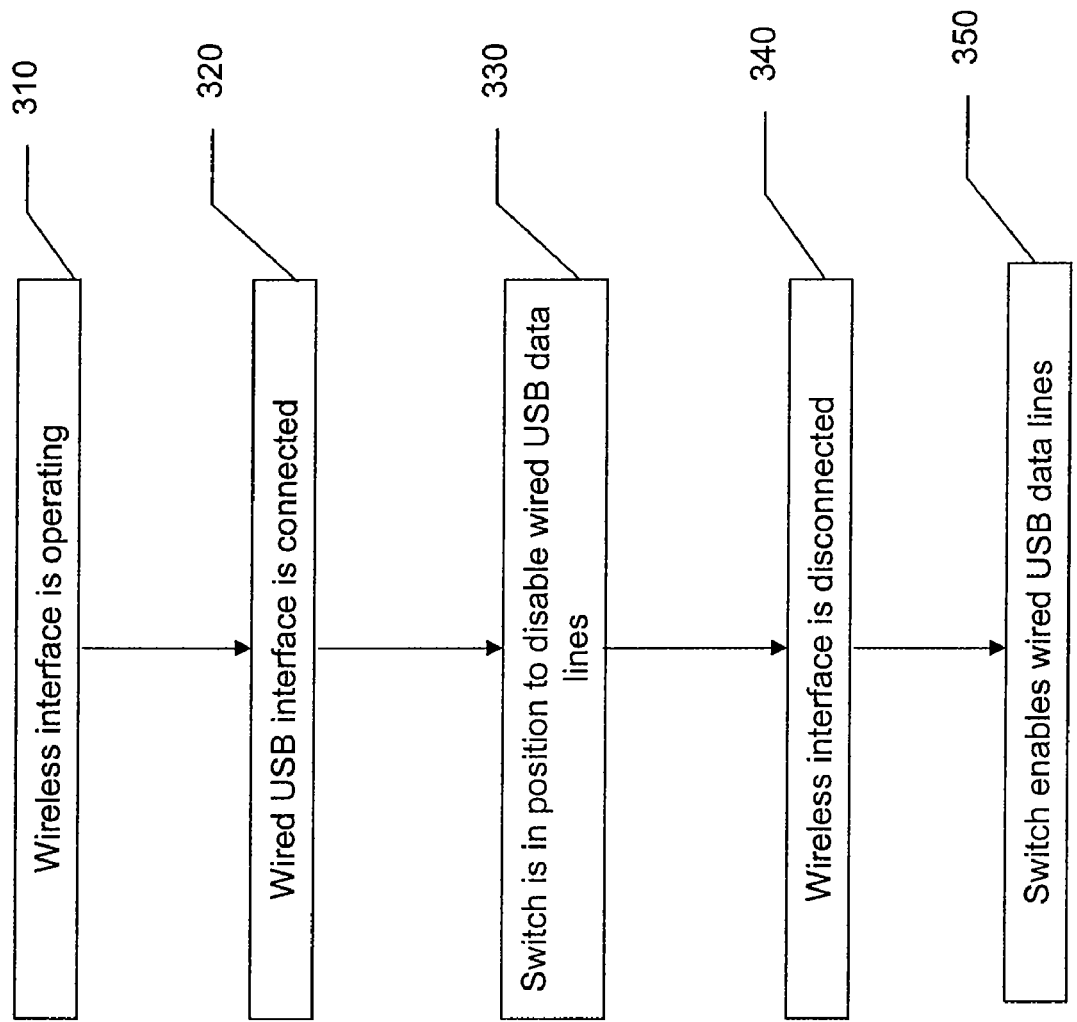
FIG. 3 is a flow diagram illustrating a method in accordance with an embodiment of the invention.

FIG. 3 illustrates a method for controlling and operating an electronic device in communication with a second electronic device in accordance with an embodiment of the present invention. At step 310, one data interface of the electronic device is actively utilized to carry a data stream generated by the electronic device to the second electronic device and to otherwise enable communication between the two devices. For example, the wireless interface is operating to carry the data stream. Another data interface of the electronic device, different from the presently used data interface, becomes physically connected to the second device or becomes available to carry the data stream to the second device at step 320. For example, the wired USB interface is connected. At step 330, a switch controlling which of the data interfaces is actively used to carry the data stream maintains the data stream through the presently used data interface despite the physical connection or availability of other data interfaces. For example, the switch is in position to disable the data lines of the wired USB interface. At step 340, the presently used data interface becomes disconnected or otherwise unavailable to carry the data stream to the second device. For example, the wireless interface is disconnected. In response, the method proceeds to step 350, in which the switch enables the transfer of the data stream to the other connected or available data interface. For example, the switch enables the data lines of the wired USB interface. In one approach, the method may loop back from step 350 to step 320, such that the presently used data interface is maintained to prevent disruptions of the user experience.

An exemplary state machine for handling the interface changes is set forth below:

1. A first interface (IF1) connected becomes the active interface and disables the other interfaces. All the command from the PC is handled by the active interface. This interface could be any of the available interfaces.

2. If a second interface (IF2) is connected it will not be active. Disabling IF2 is part of the first step.

3. Switch to IF2 will happen if one of the 2 conditions below happen:
   a. A command sent to IF 1 requests to switch interfaces
   b. The active interface (IF1 in this example) is disconnected or lost.

The foregoing describes embodiments for implementing the concepts of the present invention. The description is for purposes of illustration and not limitation. For example, the electronic device could be other than a webcam or camera, such as a mobile phone, PDA, joystick, gamepad, etc. The second device could be a computer, game console, set-top box, etc. Modifications of the above embodiments that are within the ordinary skill of the art are fully contemplated and encompassed by the scope of the present invention, which is limited only by the appended claims.

What is claimed is:

1. A camera configured to communicate with a second device, the camera comprising:
   a signal source generating an image data stream;
   a wireless data interface for carrying the data stream to the second device;
   a wired data interface for carrying the data stream to the second device, the wired interface comprising data lines and power lines;
   wherein each interface is capable of individually carrying the data stream;
   a switch for controlling which of the interfaces is used to carry the data stream to the second device, the switch configured to maintain the data stream through the wireless data interface when the wireless data interface is in use and a plug associated with the wired data interface becomes physically connected to the second device and the switch further configured for automatically disabling the data lines of said wired data interface so that said wired data interface can be used for only providing power through the power lines to said camera wherein the power provided to the camera recharges a battery of the camera and/or provides operating power to the camera.

2. The camera of claim 1 wherein the switch deactivates data lines associated with the wired data interface so long as the wireless data interface is available to carry the data stream to the second device.

3. The camera of claim 1 wherein the wired data interface is a plug-and-play interface.

4. The camera of claim 1 wherein the data stream includes audio and video signals.

5. The cameral of claim 1 wherein the second device is a computer, game console, or a set-top box.

6. A method of controlling an electronic device in communication with a second device, the method comprising:
   generating a data stream;

controlling which of a plurality of data interfaces is presently used to carry the data stream between the electronic device and the second device;

maintaining the data stream through a presently used data interface when a plug-and-play data interface becomes physically connected to the second device or becomes available to carry the data stream to the second device, the plug-and-play interface comprising data lines and power lines;

automatically disabling the data lines of said plug-and-play interface so that said plug-and-play interface can be used for only providing power through the power lines to said electronic device; and supplying operating power to the electronic device and/or recharging a battery of the electronic device using the received power.

7. The method of claim 6 wherein the step of controlling comprises controlling which of a wireless data interface and a wired data interface is presently used to carry the data stream to the second device.

8. The method of claim 6 wherein the step of maintaining comprises maintaining the data stream through a wireless data interface presently used to carry the data stream when a plug associated with the plug-and-play data interface becomes connected to the second device.

9. The method of claim 6 wherein the step of maintaining comprises deactivating signal lines of the plug-and-play data interface so long as the presently used data interface is available to carry the data stream to the second device.

10. The method of claim 6 further comprising receiving power from one of the plug-and-play data interface that is physically connected to the second device.

11. The method of claim 6 further comprising transferring the data stream to the plug-and-play data interface when the presently used data interface fails.

12. The method of claim 11 further comprising maintaining the data stream through the plug-and-play data interface when a wireless data interface becomes available to carry the data stream to the second device.

13. An electronic device configured to communicate with a second device, the electronic device comprising:
a signal source generating an image data stream;
a wireless data interface for carrying the data stream to the second device;
a wired data interface for carrying the data stream to the second device, the wired interface comprising data lines and power lines;
wherein each interface is capable of individually carrying the data stream;
a switch for controlling which of the interfaces is used to carry the data stream to the second device, the switch configured to maintain the data stream through the wireless data interface when the wireless data interface is in use and a plug associated with the wired data interface becomes physically connected to the second device and the switch further configured for automatically disabling the data lines of said wired data interface so that said wired data interface can be used for only providing power through the power lines to said electronic device wherein the power provided to the electronic device recharges a battery of the electronic device and/or provides operating power to the electronic device.

14. The electronic device of claim 13 wherein the wired interface is a USB interface, a parallel port interface, or an HDMI interface.

15. The electronic device of claim 13 wherein the wireless interface uses a WiFi protocol.

16. The electronic device of claim 13 wherein the wired interface is a USB interface that is physically connected to the second device and the switch is configured to deactivate signal pins of a USB plug associated with the USB interface.

17. The electronic device of claim 13 wherein the switch is configured to transfer a data stream to the wired interface when the wireless interface fails.

18. The electronic device of claim 13 wherein the second device is a personal computing device capable of processing data.

19. The electronic device of claim 13 wherein the switch is controlled by software residing on one of the electronic device and the second device.

20. A camera configured to communicate with a second device, the camera comprising:
a signal source generating an image data stream;
a wireless interface for carrying the data stream to the second device;
a wired interface for carrying the data stream to the second device, the wired interface comprising data lines and power lines;
wherein each interface is capable of individually carrying the data stream;
a controller, coupled to the data lines of said wired interface, for handling communications over said wired interface;
a switch for controlling which of the interfaces is used to carry the data stream to the second device, the switch configured to automatically and electrically isolate the data lines between the controller and data lines of a said wired interface so that said wired data interface can be used for only providing power through the power lines to said camera wherein the power provided to the camera recharges a battery of the camera and/or provides operating power to the camera,
said switch being controlled by said controller, said controller detecting if a wireless interface is being used, and in response causing said switch to isolate said data lines.

21. The camera of claim 20 wherein the controller monitors the wireless interface and activates the switch to connect to the data lines of the wired interface if the controller detects a failure in the wireless interface.

* * * * *